US012769377B2

(12) United States Patent
Hsieh et al.

(10) Patent No.: US 12,769,377 B2
(45) Date of Patent: Oct. 20, 2026

(54) ADAPTIVE THERMAL THROTTLING METHOD AND RELATED SYSTEM

(71) Applicant: MEDIATEK INC., Hsin-Chu (TW)

(72) Inventors: Hsien-Hsi Hsieh, Hsinchu City (TW); Ching-Yeh Chen, Hsinchu City (TW); Yu-Ming Lin, Hsinchu City (TW); Hsing-Ju Wei, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 471 days.

(21) Appl. No.: 18/231,256

(22) Filed: Aug. 8, 2023

(65) Prior Publication Data

US 2025/0053211 A1 Feb. 13, 2025

(51) Int. Cl.
*G06F 1/20* (2006.01)
*G06F 1/3206* (2019.01)
*G06F 9/50* (2006.01)

(52) U.S. Cl.
CPC ............ *G06F 1/206* (2013.01); *G06F 1/3206* (2013.01); *G06F 9/5094* (2013.01)

(58) Field of Classification Search
CPC ........ G06F 1/206; G06F 1/3206; G06F 1/324; G06F 1/3243; G06F 1/3296; G06F 9/5094
USPC .......................................................... 700/300
See application file for complete search history.

(56) References Cited

U.S. PATENT DOCUMENTS

2004/0133816 A1* 7/2004 Miyairi ................... G06F 1/324 713/300
2012/0166839 A1* 6/2012 Sodhi .................... G06F 1/3206 713/324
2015/0346809 A1* 12/2015 Kumar .................. G06F 9/4893 713/323
2015/0348226 A1 12/2015 Vaishampayan
2016/0274629 A1* 9/2016 Lovicott ................. G06F 1/206
2017/0371390 A1 12/2017 Wang
2018/0004262 A1* 1/2018 Lovicott ................. G06F 1/206
2018/0088639 A1* 3/2018 Remis ................. G06F 9/44505
2024/0176498 A1* 5/2024 Redaelli ................ G06F 3/0655

FOREIGN PATENT DOCUMENTS

CN 104049712 4/2017
CN 111566590 8/2020
TW 1294566 3/2008
TW 1339842 4/2011

OTHER PUBLICATIONS

Seyeon Kim et al., zTT: Learning-based DVFS with Zero Thermal Throttling for Mobile Devices, Jun. 24-Jul. 2, 2021, pp. 41-53, Association for Computing Machinery, WI, USA, XP058536139, Jun. 24, 2021.

* cited by examiner

*Primary Examiner* — Chun Cao
(74) *Attorney, Agent, or Firm* — Winston Hsu

(57) ABSTRACT

A system comprises a controller, configured to receive at least one thermal control setting and a system temperature, and to perform a first thermal throttling operation according to at least one thermal control instruction; and an application, coupled to the controller, configured to receive the at least one thermal control setting and the system temperature from the controller, and to generate the at least one thermal control instruction according to the at least one thermal control setting and the system temperature.

14 Claims, 6 Drawing Sheets

ADAPTIVE THERMAL THROTTLING METHOD AND RELATED SYSTEM

BACKGROUND

CPU/GPU of an electronic device, such as a mobile phone or a computer, may generate heat while running an application (APP), such as a game, and may cause the electronic device to overheat if heat excessively accumulates. In response, the system may reduce the operating frequency of the CPU/GPU, causing fluctuations in the frame rate of the game (such as frames per second, FPS), and affecting the user's experience. Therefore, finding ways to achieve thermal throttling without compromising the user's gaming experience has become a goal in the industry.

SUMMARY

Therefore, the purpose of the present invention is to provide an adaptive thermal throttling method and related system to improve the drawback of the prior art.

The embodiment of the present invention discloses a system, comprising a controller, configured to receive at least one thermal control setting and a system temperature, and to perform a first thermal throttling operation according to at least one thermal control instruction; and an application (APP), coupled to the controller, configured to receive the at least one thermal control setting and the system temperature from the controller, and to generate the at least one thermal control instruction according to the at least one thermal control setting and the system temperature.

The embodiment of the present invention discloses an adaptive thermal throttling method, comprising receiving, by an application (APP), at least one thermal control setting and a system temperature of a system via a controller; generating, by the APP, at least one thermal control instruction according to the at least one thermal control setting and the system temperature, and providing the at least one thermal control instruction to the controller; performing, by the controller, a first thermal throttling operation according to the at least one thermal control instruction.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". "Approximately" means that within the acceptable error range, a person with ordinary knowledge in the field can solve the technical problem within a certain error range and basically achieve the technical effect. Also, the term "couple" is intended to mean either an indirect or direct, wired or wireless electrical connection.

Figure 1:
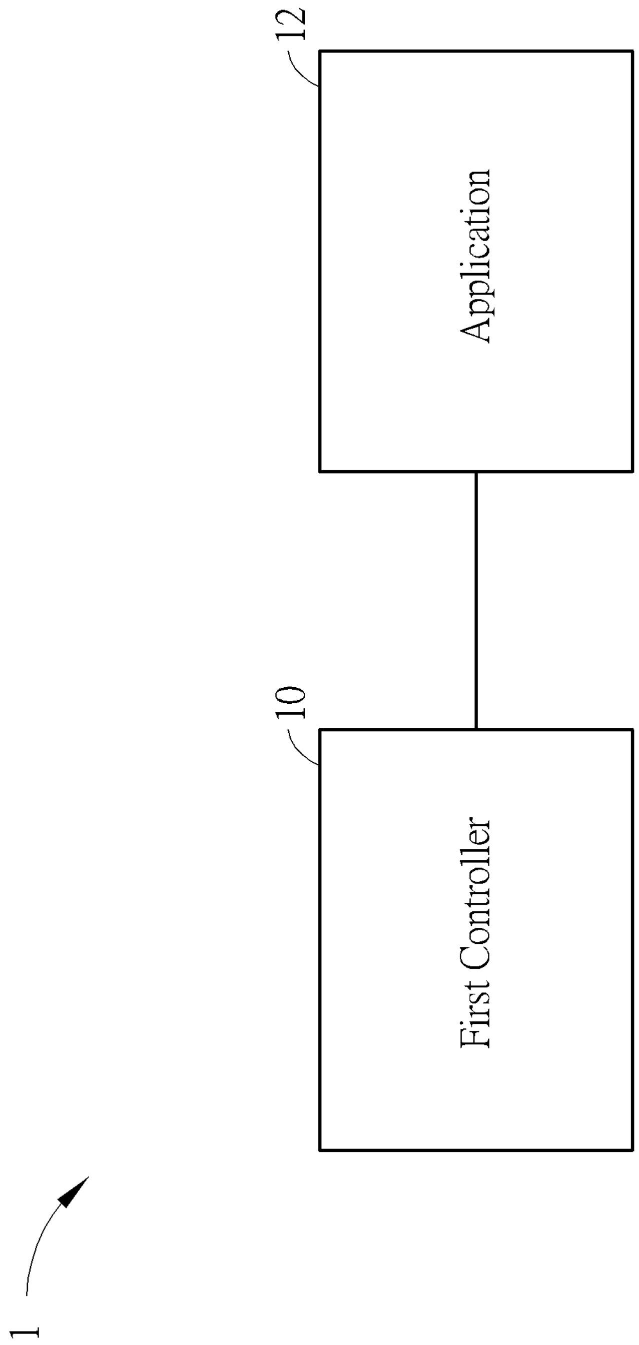
FIG. 1 is a schematic diagram of a conventional thermal throttling system.

Please refer to FIG. 1. FIG. 1 is a schematic diagram of a thermal throttling system 1. The thermal throttling system 1 includes a first controller 10 of a user equipment (UE) and an application (APP) 12. The UE, which may be a mobile phone or a computer, runs the APP 12, such as a gaming or drawing APP. While the UE is running the APP 12, a CPU or GPU thereof may continuously generate heat. If heat accumulates, the UE may enter an overheating state.

Figure 2:
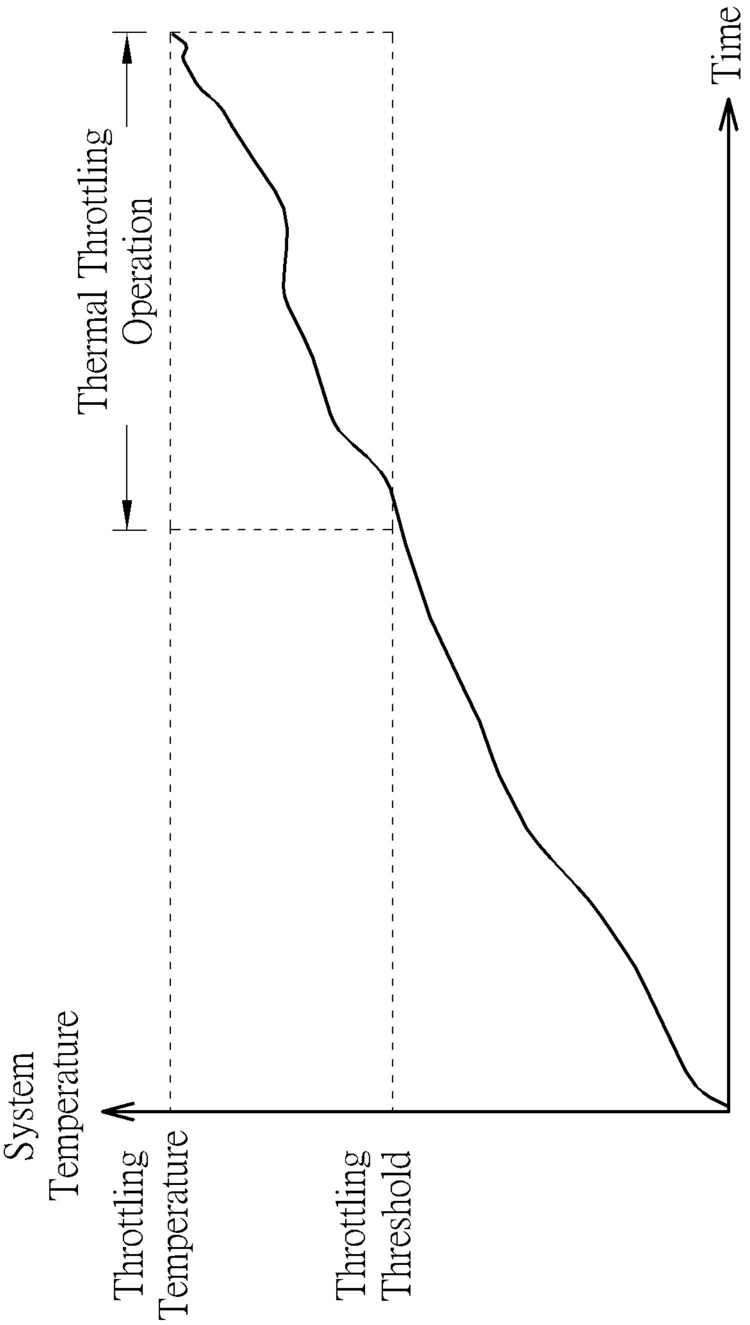
FIG. 2 is a temperature diagram of the thermal throttling operation.

To prevent the UE from entering the overheating state, the first controller 10 performs a thermal throttling operation. Please refer to FIG. 2. FIG. 2 is a temperature diagram of the thermal throttling operation. As shown in FIG. 2, the overheating state occurs when a system temperature exceeds a throttling temperature. When the system temperature reaches a throttling threshold, the first controller 10 starts to perform the thermal throttling operation. For example, the first controller 10 may gradually reduce a game frame rate by lowering a target FPS of the gaming APP or setting the target FPS to a low fixed value before the UE enters the overheating state. This helps avoid severe FPS fluctuations or lag while running the game APP. However, even though thermal throttling is achieved, the user's gaming experience may still be compromised due to reduced FPS.

Figure 3:
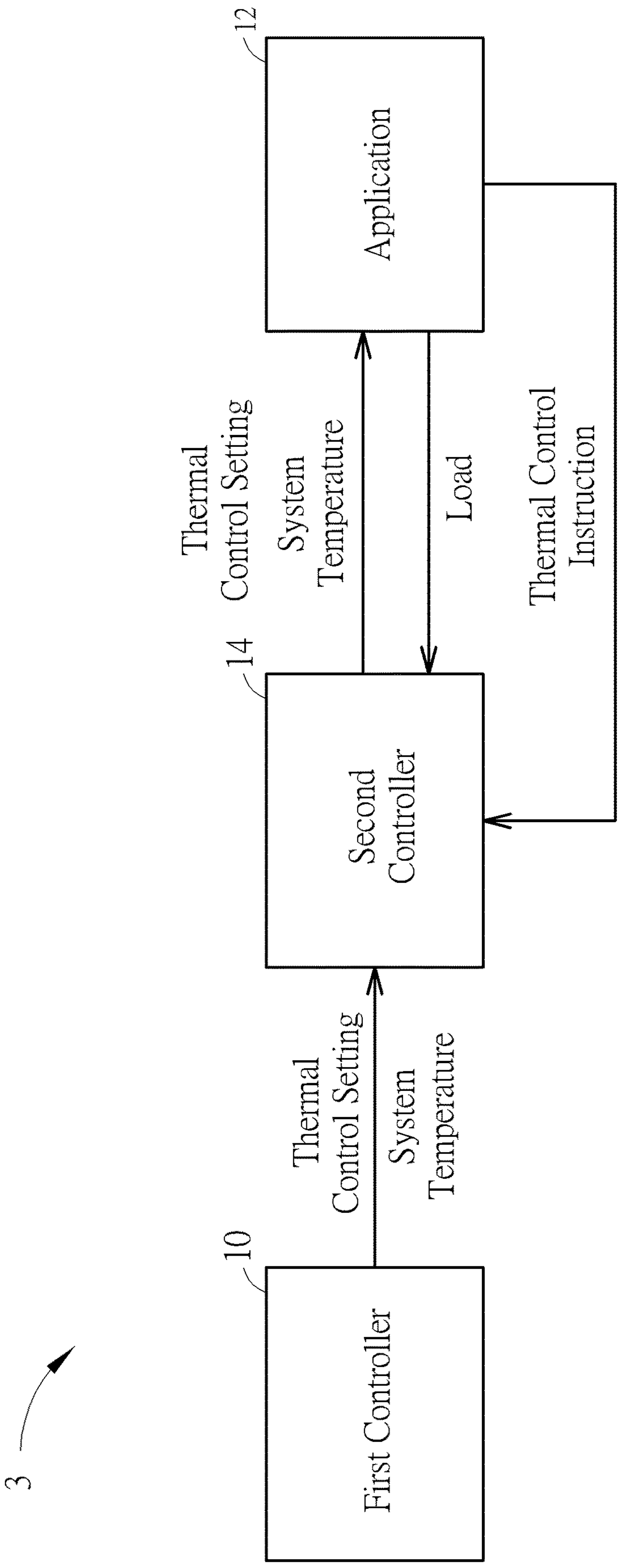
FIG. 3 is a schematic diagram of an adaptive thermal throttling system according to an embodiment of the present invention.

It should be noted that, for the sake of brevity, the following embodiments are described in a scenario where the APP 12 is running. In order to prevent the UE from entering the overheating state, the present invention uses a platform for information exchange between the APP 12 and the first controller 10 of the UE. Please refer to FIG. 3. FIG. 3 is a schematic diagram of an adaptive thermal throttling system 3 according to an embodiment of the present invention. The adaptive thermal throttling system 3 is derived from the thermal throttling system 1, so the same components are denoted by the same symbols. The difference between the adaptive thermal throttling system 3 and the thermal throttling system 1 is that a second controller 14 of the platform is coupled between the first controller 10 and the APP 12. The APP 12 may receive at least one thermal control setting and the system temperature from the first controller 10 via the second controller 14, and accordingly generate the at least one thermal control instruction. The second controller 14 may perform a first thermal throttling operation based on the at least one thermal control instruction, thereby preventing the UE from entering the overheating state. It should be noted that in contrast to the thermal throttling system 1, where the APP 12 does not participate in the thermal throttling operation, in the adaptive thermal throttling system 3, the APP 12 does.

Figure 4:
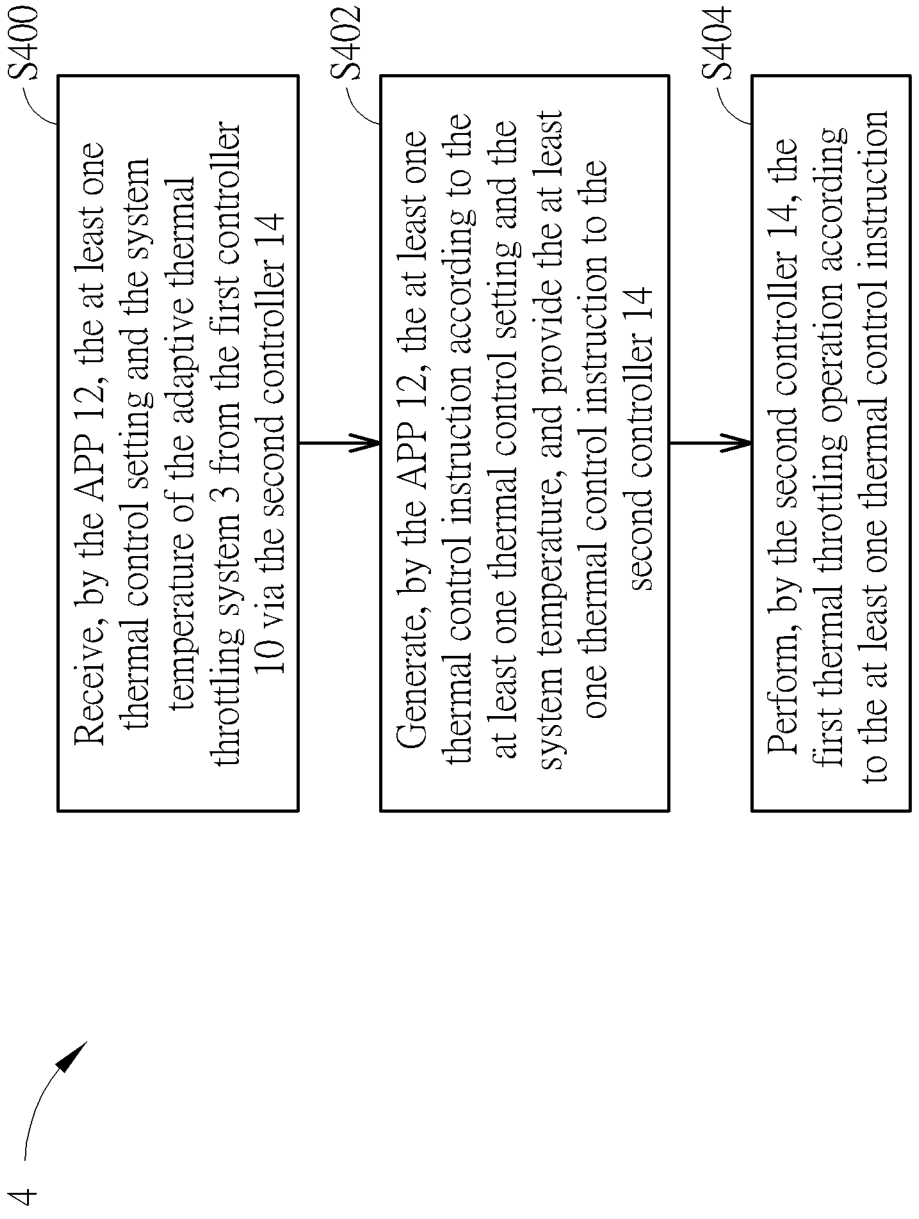
FIG. 4 is a flowchart of an adaptive thermal throttling method according to the embodiment of the present invention.

The operations of the adaptive thermal throttling system 3 may be summarized as an adaptive thermal throttling method 4, as shown in FIG. 4. The adaptive thermal throttling method 4 includes the following steps:

Step S400: Receive, by the APP 12, the at least one thermal control setting and the system temperature of the adaptive thermal throttling system 3 from the first controller 10 via the second controller 14.

Step S402: Generate, by the APP 12, the at least one thermal control instruction according to the at least one thermal control setting and the system temperature, and provide the at least one thermal control instruction to the second controller 14.

Step S404: Perform, by the second controller 14, the first thermal throttling operation according to the at least one thermal control instruction.

In step S400, the APP 12 receives the at least one thermal control setting and the system temperature from the first controller 10 via the second controller 14. Specifically, a sensor of the UE (not shown in FIG. 3) generates the system temperature. The first controller 10 determines the at least one thermal control setting, such as a thermal alert condition, a high load condition, a drop frame condition, a target power, a boost permission, or an APP programming interface query permission. These thermal control settings are well known in the art, and will not be described in detail here. For example, the thermal alert condition is used to warn that the system temperature may be too high.

Figure 5:
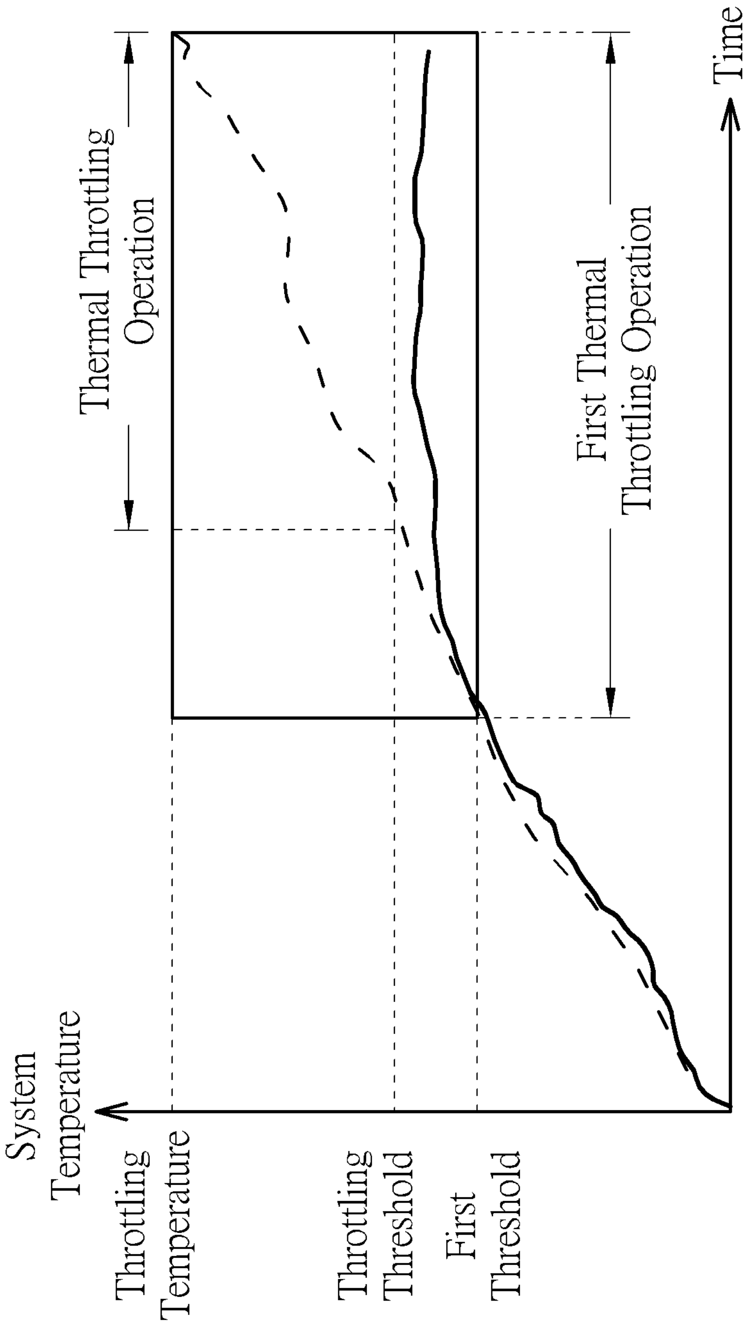
FIG. 5 is a temperature diagram of the first thermal throttling operation according to the embodiment of the present invention.

In step S402, the APP 12 generates the at least one thermal control instruction based on the at least one thermal control setting and the system temperature, and provides the at least one thermal control instruction to the second controller 14. Please refer to FIG. 5. FIG. 5 is a temperature diagram of the first thermal throttling operation according to the embodiment of the present invention. The APP 12 generates a first threshold according to the at least one thermal control setting, and compares the first threshold with the system temperature to generate the at least one thermal control instruction. In an embodiment, the at least one thermal control instruction may include decreasing or increasing an image quality, a character movement update frequency, etc. In another embodiment, the at least one thermal control instruction may include decreasing or increasing target performance of a CPU or GPU of the UE.

In step S404, the second controller 14 performs the first thermal throttling operation based on the at least one thermal control instruction. As shown in FIG. 5, when the system temperature exceeds the first threshold, the at least one thermal control instruction indicates a decrease in image quality and character movement update frequency to reduce the load on the CPU/GPU while running the APP 12. This causes the system temperature to drop and prevents the UE from entering the overheating state. Conversely, when the system temperature is below the first threshold, the at least one thermal control instruction indicates an increase in image quality and character movement update frequency to increase the load on the CPU/GPU while running the APP 12. Therefore, the user's gaming experience is improved.

In an embodiment, the adaptive thermal throttling system 3 may combine the first thermal throttling operation with the thermal throttling operation. As shown in FIG. 5, if the system temperature continues to rise above the throttling threshold after performing the first thermal throttling operation, the second controller 14 may perform the thermal throttling operation to prevent the UE from entering the overheating state. It should be note that the throttling threshold is larger than the first threshold.

Figure 6:
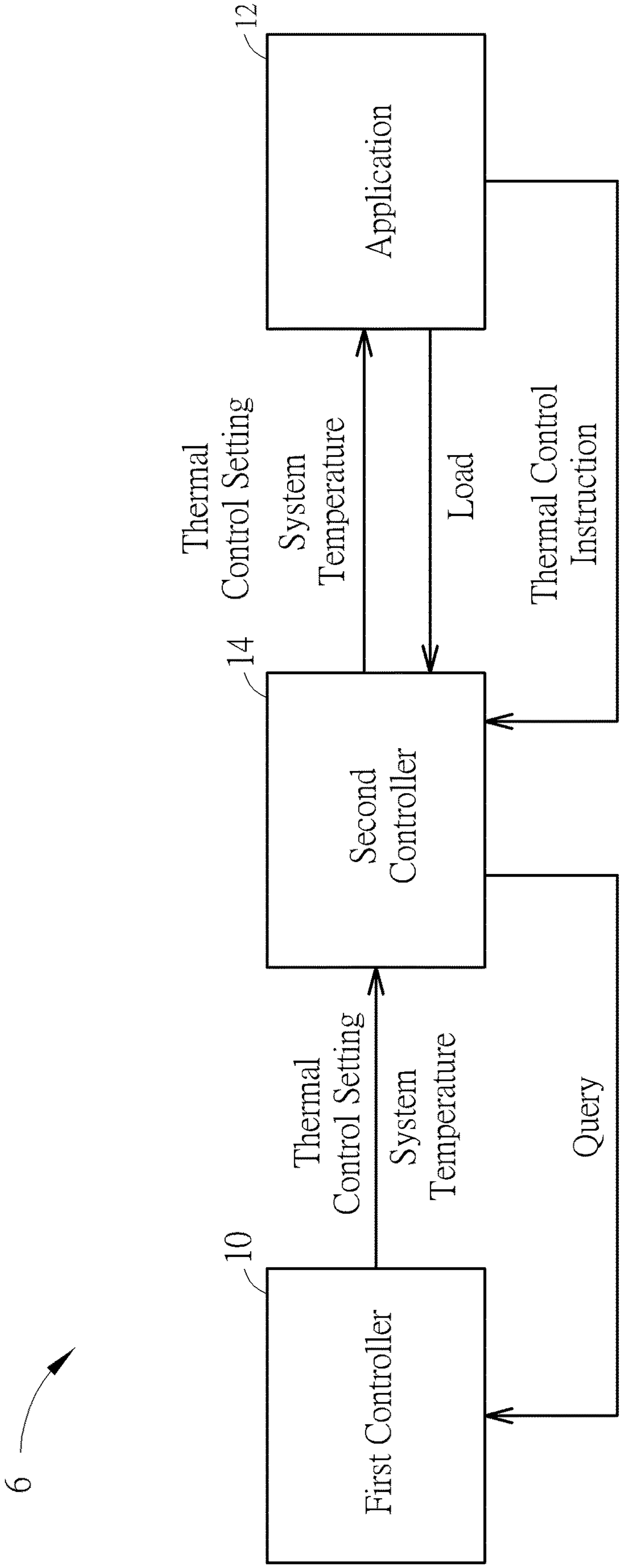
FIG. 6 is a schematic diagram of an adaptive thermal throttling system according to an embodiment of the present invention.

It should be noted that UEs produced by different original equipment manufacturers (OEMs) may have different specifications for the thermal control settings. In addition, the thermal control settings may not be provided to the APP to generate the thermal control instructions. In such cases, the present invention may query the first controller 10 to determine whether to perform the first thermal throttling operation based on the at least one thermal control instruction. Please refer to FIG. 6. FIG. 6 is a schematic diagram of an adaptive thermal throttling system 6 according to an embodiment of the present invention. The difference between the adaptive thermal throttling system 6 and the adaptive thermal throttling system 3 is that the second controller 14 of the adaptive thermal throttling system 6 may query the first controller 10 about providing the at least one thermal control setting or performing the first thermal throttling operation according to the at least one thermal control instruction. Further details and derivative changes of the adaptive thermal throttling system 6 may be referred to the above, and will not be repeated here.

It should be noted that the adaptive thermal throttling systems 3, 6 are different embodiments of the present invention. Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (COM) and the computer system. Any of the abovementioned procedures and examples above may be compiled into program codes or instructions that are stored in a storage unit. The storage unit may include read-only memory (ROM), flash memory, random access memory (RAM), subscriber identity module (SIM), hard disk, or CD-ROM/DVD-ROM/BD-ROM, but not limited thereto. The first controller 10 and the second controller 14 may read and execute the program codes or the instructions stored in the storage unit for realizing the abovementioned functions.

In summary, in the adaptive thermal throttling system of the present invention, the APP generates the thermal control instructions that allow the UE to adjust the load or the target performance of the CPU/GPU. In this way, compared with the prior art, the adaptive thermal throttling system of the present invention prevents changes in FPS and improves the user's experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system, comprising:

a first controller, configured to provide at least one thermal control setting and a system temperature of the system;

a controller, coupled to the first controller, configured to receive the at least one thermal control setting and the system temperature, and to query the first controller whether to perform a first thermal throttling operation according to at least one thermal control instruction; and an application (APP), running on a CPU or a GPU of the system, configured to receive the at least one thermal control setting and the system temperature from the controller, and to generate the at least one thermal control instruction according to the at least one thermal control setting and the system temperature.

2. The system of claim 1, wherein the first thermal throttling operation comprises at least one of the following steps:

increasing or decreasing a target performance of the CPU or the GPU of the system; and increasing or decreasing a load of the CPU or the GPU.

3. The system of claim 1, wherein the APP is configured to generate a first threshold according to the at least one thermal control setting, and to compare the first threshold with the system temperature to generate the at least one thermal control instruction.

4. The system of claim 3, wherein the controller is further configured to perform a second thermal throttling operation according to the at least one thermal control setting and the system temperature.

5. The system of claim 4, wherein the controller is configured to generate a second threshold according to the at least one thermal control setting, and to compare the second threshold with the system temperature to determine whether to perform the second thermal throttling operation.

6. The system of claim 5, wherein the second threshold is larger than the first threshold.

7. The system of claim 4, wherein the second thermal throttling operation comprises at least one of the following steps:

increasing a target performance of the CPU or the GPU of the system; and decreasing the target performance of the CPU or the GPU.

8. An adaptive thermal throttling method, comprising:

receiving, by an application (APP) running on a CPU or a GPU of a system, at least one thermal control setting and a system temperature of the system via a controller of the system;

generating, by the APP, at least one thermal control instruction according to the at least one thermal control setting and the system temperature, and providing the at least one thermal control instruction to the controller; and performing, by the controller, a first thermal throttling operation according to the at least one thermal control instruction;

wherein the at least one thermal control setting and the system temperature of the system is provided by a first controller of the system;

wherein performing the first thermal throttling operation comprises:

querying, by the controller, the first controller whether to perform the first thermal throttling operation according to the at least one thermal control instruction.

9. The adaptive thermal throttling method of claim 8, wherein the first thermal throttling operation comprises at least one of the following steps:

increasing or decreasing a target performance of the CPU or the GPU of the system; and increasing or decreasing a load of the CPU or the GPU.

10. The adaptive thermal throttling method of claim 8, wherein generating the at least one thermal control instruction comprises:

generating a first threshold according to the at least one thermal control setting; and comparing, by the APP, the first threshold with the system temperature to generate the at least one thermal control instruction.

11. The adaptive thermal throttling method of claim 10, further comprising:

performing, by the controller, a second thermal throttling operation according to the at least one thermal control setting and the system temperature.

12. The adaptive thermal throttling method of claim 11, further comprising:

generating, by the controller, a second threshold according to the at least one thermal control setting, and comparing the second threshold with the system temperature to determine whether to perform the second thermal throttling operation.

13. The adaptive thermal throttling method of claim 12, wherein the second threshold is larger than the first threshold.

14. The adaptive thermal throttling method of claim 11, wherein the second thermal throttling operation comprises at least one of the following steps:

increasing a target performance of the CPU or the GPU of the system; and decreasing the target performance of the CPU or the GPU.

* * * * *